(12) United States Patent
Do (10) Patent No.: US 7,009,783 B2
(45) Date of Patent: Mar. 7, 2006

(54) PICKUP LENS

(75) Inventor: Satoshi Do, Saitama (JP)

(73) Assignee: Milestone Co., Ltd., Tokyo (JP)

( * ) Notice: Subject to any disclaimer, the term of this patent is extended or adjusted under 35 U.S.C. 154(b) by 363 days.

(21) Appl. No.: 10/606,754

(22) Filed: Jun. 27, 2003

(65) Prior Publication Data

US 2004/0125468 A1     Jul. 1, 2004

(30) Foreign Application Priority Data

Jul. 30, 2002   (JP) .............................. 2002-221413

(51) Int. Cl.
 *G02B 9/60*   (2006.01)
 *G02B 9/00*   (2006.01)
 *G02B 9/34*   (2006.01)

(52) U.S. Cl. ....................... 359/754; 359/770; 359/680; 359/781; 359/686

(58) Field of Classification Search ................ 359/754, 359/770, 680, 781, 686, 766, 763, 753, 752, 359/771
See application file for complete search history.

(56) References Cited

U.S. PATENT DOCUMENTS 5,459,615 A    10/1995   Yahagi ........................ 359/672

FOREIGN PATENT DOCUMENTS

| JP | 05249372 | 9/1993 |
| JP | 11084234 | 3/1999 |
| JP | 11038316 | 12/1999 |
| JP | 2000171697 | 6/2000 |
| JP | 2002-098888 | 4/2002 |
| JP | 2002-517773 | 6/2002 |
| WO | WO 99 63379 | 12/1999 |

*Primary Examiner*—Timothy Thompson
(74) *Attorney, Agent, or Firm*—Venable, LLP; James R. Burdett (57) ABSTRACT

A pickup lens is provided in which various aberrations are satisfactorily corrected, which can be manufactured at low cost, and which has an optical length of 10 mm or less. This pickup lens is configured by arranging, in order from the object side, a first lens $L_1$ with a meniscus shape with concave surface on the object side and having negative refractive power, an aperture diaphragm S, a second lens $L_2$ with convex surfaces on both sides and having positive refractive power, a third lens $L_3$ with concave surfaces on both sides and having negative refractive power, and a fourth lens $L_4$ with convex surfaces on both sides and having positive refractive power; and with the following conditions satisfied.

$$+5.0<(r_2+r_1)/(r_2-r_1)<+7.0 \quad (1)$$

$$0.15f<d_1<0.3f \quad (2)$$

Here $r_1$ is the radius of curvature of the object-side surface of the first lens in the vicinity of the optical axis (axial radius of curvature), $r_2$ is the radius of curvature of the image-side surface of the first lens in the vicinity of the optical axis (axial radius of curvature), $d_1$ is the thickness of the first lens, and f is the focal length of the entire system.

6 Claims, 13 Drawing Sheets

PICKUP LENS

BACKGROUND OF THE INVENTION

1. Field of the Invention

This invention relates to a pickup lens suitable for mounting in a camera which uses a CCD or CMOS device as a pickup element.

2. Description of Related Art

One characteristic of this pickup lens is a short optical length. Another characteristic is that various aberrations thereof are corrected to amounts sufficiently small that distortion of the image formed by this pickup lens is not recognized by visual perception, and sufficiently small as to satisfy the requirements of the integration density of the pickup element. Below, "various aberrations are corrected to amounts sufficiently small that distortion of the image formed by this pickup lens is not recognized by visual perception, and sufficiently small as to satisfy the requirements of the integration density of the pickup element" is, for simplicity, represented by the phrase "various aberrations are satisfactorily corrected" or similar. An image for which various aberrations are satisfactorily corrected may be called "satisfactory image".

A pickup lens mounted in a compact camera which uses a CCD or CMOS device as a pickup element must have a short optical length, and must be able to be manufactured at low cost. One such lens is, for example, the pickup lens disclosed in Japanese Patent Laid-open No. 11-38316. However, although the pickup lens disclosed in this publication comprises few components, which number four elements in four groups, the first lens, which is the initial lens approaching from the object side, is very thick and so difficult to machine. As a result, manufacturing costs are increased and productivity is poor. Moreover, the optical length exceeds 10 mm, so that the optical length is too long for a lens mounted in a compact camera which uses a CCD or CMOS device as a pickup element.

This invention has as an object the provision of a pickup lens in which various aberrations are satisfactorily corrected, which can be manufactured at low cost, and which has an optical length of 10 mm or less.

SUMMARY OF THE INVENTION

A pickup lens of this invention which achieves the above object has a four-element, four-group configuration, in which are arranged, in order from the object side, a first lens $L_1$, an aperture diaphragm S, a second lens $L_2$, a third lens $L_3$, and a fourth lens $L_4$. The first lens $L_1$ is a meniscus-shape lens with negative refractive power, arranged with concave face on the object side. The second lens $L_2$ is a lens with convex faces on both the object side and the image side, and having positive refractive power. The third lens $L_3$ is a lens with concave faces on both the object side and the image side, and having negative refractive power. The fourth lens $L_4$ is a lens with convex faces on both the object side and the image side, and having positive refractive power.

Among all the eight lens faces forming these first through fourth lenses (each lens has one curved surface on each of the object and the image sides, so that the total number of faces for the four lenses is eight), at least three lens faces are aspherical and satisfy the following conditions.

$$+5.0 < (r_2+r_1)/(r_2-r_1) < +7.0 \quad (1)$$

$$0.15f < d_1 < 0.3f \quad (2)$$

Here $r_1$ is the radius of curvature in the vicinity of the optical axis of the face on the object side of the first lens (axial radius of curvature); $r_2$ is the radius of curvature in the vicinity of the optical axis of the face on the image side of the first lens (axial radius of curvature); $d_1$ is the thickness of the first lens; and f is the focal length of the entire system (the combined focal length of the lens system comprising the first, second, third, and fourth lenses).

So-called bending operations can be performed in which, by changing both the radii of curvature $r_1$ and $r_2$ of the first lens, aberrations alone can be changed without changing the lens focal length. Under conditions such that the lens focal length does not change, the value of q given by $q=(r_2+r_1)/(r_2-r_1)$ when $r_1$ and $r_2$ are changed is called the lens shape factor, and is a parameter representing the degree of bending. That is, the parameter q is 0 for a symmetrical lens ($r_1=-r_2$), and becomes larger as the lens becomes more asymmetrical. and so is a parameter representing the extent of deviation from a symmetrical lens (the extent of asymmetry).

Hence the above condition equation (1) means that the parameter q, which represents the extent of bending of the first lens, should be set within the range +5.0 to +7.0.

By having the lenses which are components satisfy the conditions stipulated by equation (1) and equation (2), and moreover by positioning the lenses in the above-described configuration, a pickup lens can be provided which can be manufactured at low cost, which has an optical length of 10 mm or less, and in which various aberrations can be satisfactorily corrected.

In the case of a pickup lens with a short combined focal length f of 3.3 mm to 4.0 mm, a back focus of approximately several millimeters must be secured. By making the negative refractive power of the first lens large, an adequate back focus can be secured.

By means of the negative lens element which is the third lens, axial chromatic aberration and lateral chromatic aberration can be satisfactorily corrected.

Equation (1) is a condition for obtaining sufficient back focus while maintaining a satisfactory image. If the radii of curvature $r_1$ and $r_2$ are set to exceed the upper limits, the meridional plane of astigmatism curves too far in the positive direction. Also, if the radii of curvature $r_1$ and $r_2$ are set below the lower limits, the back focus becomes short and the angle of the ray incident on the CCD imaging surface becomes an acute angle. Consequently total reflection occurs due to the microlens at the peripheral portion of the image, so that the peripheral portion of the image becomes dark. In addition, the meridional plane of astigmatism curves too far in the negative direction.

By positioning a diaphragm between the first lens and the second lens, negative distortion aberration (barrel distortion) in the second and fourth lenses placed thereafter can be corrected.

Equation (2) gives the condition for correction of curvature of field, while maintaining a short total length for the lens system and a small diameter for the first lens. If the thickness $d_1$ of the first lens exceeds the upper-limit thickness, the total lens length and the first lens diameter become too great, and compactness of the lens system is lost. Also, the negative distortion aberration increases. If $d_1$ is smaller than the lower limit of equation (2), so that the lens thickness is reduced, the curvature of field increases, which is also undesirable. Also, if $d_1$ is decreased below the lower limit of equation (2), and a plastic lens is used, it will be difficult to shape the lens according to design.

As is clear in Embodiment 1 and Embodiment 2 described below, by means of the two conditions given by equation (1) and equation (2), a pickup lens with excellent productivity, in which various aberrations are satisfactorily corrected, and with an optical length of 10 mm or less, can be realized.

Further, it is preferable that a pickup lens of this invention be formed from component lenses all of which are of a plastic material (a polymer material which can be molded and shaped by plastic deformation under the application of heat or pressure, or both, and which is transparent to visible light).

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

Below aspects of this invention are explained, referring to the drawings. These drawings merely show in summary the shapes, sizes, and positional relations of components to an extent enabling an understanding of this invention, and the numerical and other conditions explained below are merely suitable examples; the present invention is not limited only to the aspects of the invention.

Embodiments

Figure 1:
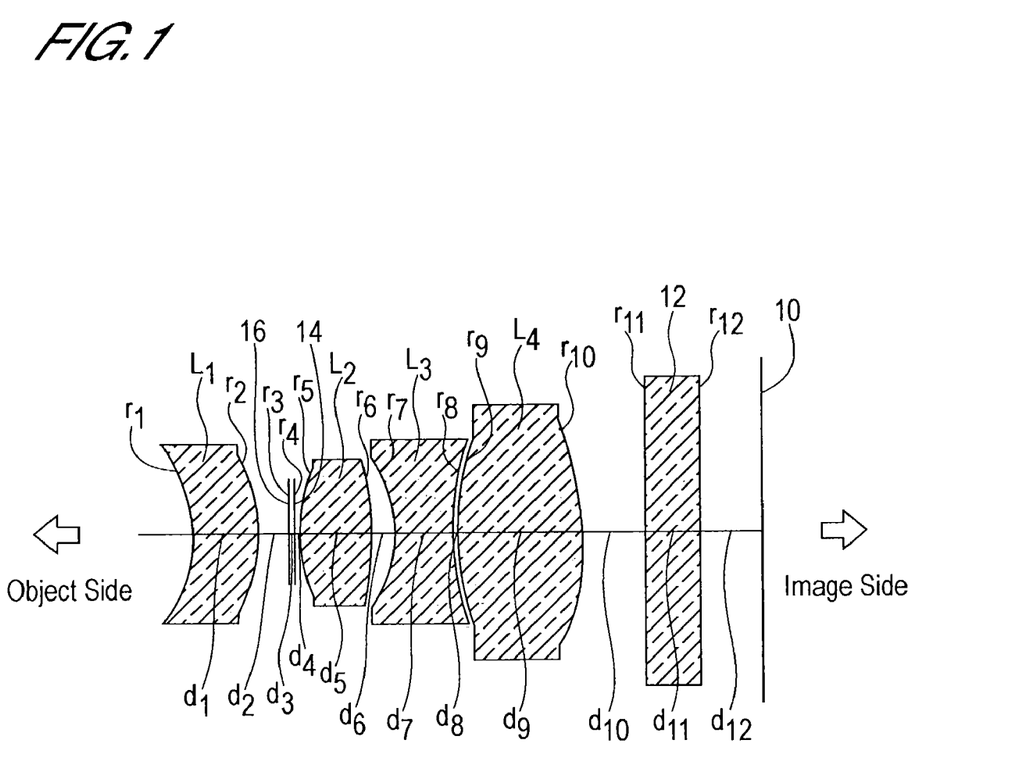
FIG. 1 is a summary cross-sectional view to explain the configuration of a pickup lens of this invention.

FIG. 1 is a diagram of the configuration of a pickup lens of this invention.

The first, second, third, and fourth lenses, counting from the object side, are represented by $L_1$, $L_2$, $L_3$, and $L_4$, respectively. The pickup surface (light-receiving surface of the solid-state pickup element) is represented by 10, the cover glass separating the pickup surface and the lens system is represented by 12, and the two diaphragm planes are represented, in order from the image side to the object side, by 14 and 16 respectively.

The parameters $r_i$ (i=1, 2, 3, ..., 12) and $d_i$ (i=1, 2, 3, ..., 12) shown in the figure and other parameters are given as specific numerical values in Table 1 through Table 4 below. The subscripts i=1, 2, ..., 12 are assigned to the lens surface numbers, or to lens thicknesses or intervals between lens surfaces, in order from the object side to the image side.

That is, $r_i$ is the radius of curvature of the ith surface (for an aspherical surface, the radius of curvature on the axis); $d_i$ is the distance from the ith surface to the i+1th surface; $N_i$ is the refractivity of the lens media from the ith surface to the i+1th surface; and, $v_i$ is the dispersion of the lens media from the ith surface to the i+1th surface.

Aspherical data is shown, together with surface numbers, in the right-hand columns of Table 1 through Table 4. The aperture diaphragms $r_3$ and $r_4$, and the cover glasses $r_{11}$ and $r_{12}$ are planar, and so the radius of curvature is indicated as $\infty$.

An aspherical surface used in this invention is represented by the following equation.

$$Z = ch^2/[1+[1-(1+k)c^2h^2]+1/2]+A_0h^4+B_0h^6+C_0h^8+D_0h^{10}$$

Here Z is the depth from the plane which is tangential at the lens vertex, c is the curvature of the surface in the vicinity of the optical axis, h is the height from the optical axis, k is the conic constant, $A_0$ is the fourth-order aspheric coefficient, $B_0$ is the sixth-order aspheric coefficient, $C_0$ is the eighth-order aspheric coefficient, and $D_0$ is the tenth-order aspheric coefficient.

In each of Table 1 through Table 4 in this Specification, in representations of numerical values indicating aspheric coefficients, "e-1" means "$10^{-1}$". Moreover, a value shown as a focal length f is the combined focal length of the lens system comprising the first, second, third, and fourth lenses.

The first and second embodiments are explained below, referring to FIG. 2 through FIG. 9. Also, two comparative examples (a first comparative example and a second comparative example) which do not satisfy the conditions indicated by the following equation (1) are explained, referring to FIG. 10 through FIG. 17.

$$+5.0 < (r_2+r_1)/(r_2-r_1) < +7.0 \tag{1}$$

That is, in the first comparative example, $r_1=-2.25$ and $r_2=-3.40$ (see Table 3), so that $(r_2+r_1)/(r_2-r_1)=4.913$, below the lower limit; and in the second comparative example, $r_1=-2.55$ and $r_2=-3.30$ (see Table 4), so that $(r_2+r_1)/(r_2-r_1)=7.800$, above the upper limit.

FIG. 2, FIG. 6, FIG. 10 and FIG. 14 show summary cross-sectional views of lens configurations and respective spot diagrams, indicating the extent of spreading of the point image in the image plane with respect to the distance of incidence. In these drawings, the spot images are drawn surrounded by a rectangle on the right side of the pickup plane 10 (light-receiving surface of the solid-state pickup element) which is long in the vertical direction, showing the extent of spreading of the point image projected on the pickup plane 10 to correspond to the size of a circle. Distortion aberration curves are shown in FIG. 3, FIG. 7, FIG. 11 and FIG. 15, astigmatic aberration curves in FIG. 4, FIG. 8, FIG. 12 and FIG. 16, and chromatic/spherical aberration in FIG. 5, FIG. 9, FIG. 13 and FIG. 17.

A distortion aberration curve shows the aberration amount (the amount by which the tangent condition is not satisfied, expressed as a percentage along the horizontal axis) versus the distance from the optical axis (expressed as a percentage along the vertical axis, with the maximum distance from the optical axis within the image plane equal to 100). An astigmatic aberration curve shows the amount of aberration along the horizontal axis (in mm units) for a distance from the optical axis, similarly to a distortion aberration curve. Astigmatism was represented as aberration amounts (in mm units) in the meridional plane and in the sagittal plane. A chromatic/spherical aberration curve shows the amount of aberration along the horizontal axis (in mm units) for a distance of incidence h (F number). In a chromatic/spherical aberration curve, aberration amounts are shown for the C line (light of wavelength 656.27 nm), the d line (light of wavelength 587.56 nm), and the g line (light of wavelength 435.84 nm). The refractivity is the refractivity for the d line (light of wavelength 587.56 nm).

Below, the radii of curvature of component lenses (mm units), intervals between lenses (mm units), refractivity of lens materials, Abbe number of lens materials, focal length, numerical aperture, and aspheric coefficients are listed for the first embodiment (Table 1), second embodiment (Table 2), first comparative example (Table 3), and second comparative example (Table 4).

TABLE 1

| Radius of Curvature ($r_i$) | Distance ($d_i$) | Refractivity ($N_i$) | Abbe Number ($v_i$) | Aspheric Coefficient | | | | |
|---|---|---|---|---|---|---|---|---|
| | | | | k | $A_0$ | $B_0$ | $C_0$ | $D_0$ |
| $r_1 = -1.72$ | $d_1 = 0.72$ | $N_1 = 1.53$ | $v_1 = 56.0$ | 0.104 | 0.522e−2 | 0.791e−2 | −0.6954e−2 | 0.4333e−2 |
| $r_2 = -2.53$ | $d_2 = 0.35$ | Aperture | | 0 | −0.6185e−1 | 0.1315e−1 | 0.2472e−1 | −0.144e−1 |
| $r_3 = \infty$ | $d_3 = 0.05$ | Diaphragm | | | | | | |
| $r_4 = \infty$ | $d_4 = 0.04$ | | | | | | | |
| $r_5 = 1.46$ | $d_5 = 0.81$ | $N_5 = 1.53$ | $v_5 = 56.0$ | 0 | −0.5248e−1 | 0.2277e−2 | 0.77e−1 | −0.3259e−1 |
| $r_6 = -2.70$ | $d_6 = 0.27$ | | | 0 | 0.4753e−1 | 0.46e−1 | −0.9776e−2 | 0.1911e−1 |
| $r_7 = -1.23$ | $d_7 = 0.63$ | $N_7 = 1.583$ | $v_7 = 30.0$ | 0 | 0.1339 | 0.2823e−1 | 0.205e−1 | −0.4348e−1 |
| $r_8 = 2.38$ | $d_8 = 0.036$ | | | | | | | |
| $r_9 = 2.375$ | $d_9 = 1.40$ | $N_9 = 1.53$ | $v_9 = 56.0$ | −0.5752 | 0.5063e−1 | 0.4741e−2 | −0.2453e−3 | 0.6564e−3 |
| $r_{10} = -2.11$ | $d_{10} = 0.7574$ | | | | | | | |
| $r_{11} = \infty$ | $d_{11} = 0.60$ | $N_{11} = 1.523$ | Cover Glass | | | | | |
| $r_{12} = \infty$ | $d_{12} = 1.00$ | | | | | | | |

Focal Length f = 3.315 mm
Numerical Aperture Fno = 3.30

TABLE 2

| Radius of Curvature ($r_i$) | Distance ($d_i$) | Refractivity ($N_i$) | Abbe Number ($v_i$) | Aspheric Coefficient | | | | |
|---|---|---|---|---|---|---|---|---|
| | | | | k | $A_0$ | $B_0$ | $C_0$ | $D_0$ |
| $r_1 = -2.45$ | $d_1 = 0.90$ | $N_1 = 1.53$ | $v_1 = 56.0$ | −0.2277 | 0.1506e−1 | −0.1981e−2 | −0.9393e−3 | 0.2354e−3 |
| $r_2 = -3.35$ | $d_2 = 1.25$ | Aperture | | 0 | −0.4867e−3 | −0.3141e−2 | 0.542e−3 | −0.2214e−6 |
| $r_3 = \infty$ | $d_3 = 0.05$ | Diaphragm | | | | | | |
| $r_4 = \infty$ | $d_4 = 0.07$ | | | | | | | |
| $r_5 = 1.821$ | $d_5 = 0.85$ | $N_5 = 1.53$ | $v_5 = 56.0$ | 0 | −0.1278e−1 | 0.9956e−3 | −0.4357e−2 | 0.2534e−2 |
| $r_6 = -5.661$ | $d_6 = 0.30$ | | | 0 | −0.9681e−2 | −0.3167e−2 | −0.4366e−2 | 0.2074e−2 |
| $r_7 = -1.58$ | $d_7 = 0.70$ | $N_7 = 1.583$ | $v_7 = 30.0$ | 0 | 0.274e−1 | 0.196e−1 | −0.108e−1 | 0.6145e−2 |
| $r_8 = 2.647$ | $d_8 = 0.04$ | | | | | | | |
| $r_9 = 2.647$ | $d_9 = 1.70$ | $N_9 = 1.53$ | $v_9 = 56.0$ | −0.2896 | 0.2136e−1 | 0.12e−1 | −0.2574e−2 | 0.9287e−3 |
| $r_{10} = -2.051$ | $d_{10} = 1.3958$ | | | | | | | |
| $r_{11} = \infty$ | $d_{11} = 1.00$ | $N_{11} = 1.523$ | Cover Glass | | | | | |
| $r_{12} = \infty$ | $d_{12} = 1.00$ | | | | | | | |

Focal Length f = 3.812 mm
Numerical Aperture Fno = 2.80

TABLE 3

| Radius of Curvature ($r_i$) | Distance ($d_i$) | Refractivity ($N_i$) | Abbe Number ($v_i$) | Aspheric Coefficient | | | | |
|---|---|---|---|---|---|---|---|---|
| | | | | k | $A_0$ | $B_0$ | $C_0$ | $D_0$ |
| $r_1 = -2.25$ | $d_1 = 0.90$ | $N_1 = 1.53$ | $v_1 = 56.0$ | −0.2277 | 0.1506e−1 | −0.1981e−2 | −0.9393e−3 | 0.2354e−3 |
| $r_2 = -3.40$ | $d_2 = 1.25$ | Aperture | | 0 | −0.4867e−3 | −0.3141e−2 | 0.542e−3 | −0.2214e−6 |
| $r_3 = \infty$ | $d_3 = 0.05$ | Diaphragm | | | | | | |
| $r_4 = \infty$ | $d_4 = 0.07$ | | | | | | | |
| $r_5 = 1.821$ | $d_5 = 0.85$ | $N_5 = 1.53$ | $v_5 = 56.0$ | 0 | −0.1278e−1 | 0.9956e−3 | −0.4357e−2 | 0.2534e−2 |
| $r_6 = -5.661$ | $d_6 = 0.30$ | | | 0 | −0.9681e−2 | −0.3167e−2 | −0.4366e−2 | 0.2074e−2 |

TABLE 3-continued

| Radius of Curvature ($r_i$) | Distance ($d_i$) | Refractivity ($N_i$) | Abbe Number ($v_i$) | Aspheric Coefficient | | | | |
|---|---|---|---|---|---|---|---|---|
| | | | | k | $A_o$ | $B_o$ | $C_o$ | $D_o$ |
| $r_7 = -1.58$ | $d_7 = 0.70$ | $N_7 = 1.583$ | $v_7 = 30.0$ | 0 | 0.274e-1 | 0.196e-1 | -0.108e-1 | 0.6145e-2 |
| $r_8 = 2.647$ | $d_8 = 0.04$ | | | | | | | |
| $r_9 = 2.647$ | $d_9 = 1.70$ | $N_9 = 1.53$ | $v_9 = 56.0$ | -0.2896 | 0.2136e-1 | 0.12e-1 | -0.2574e-2 | 0.9287e-3 |
| $r_{10} = -2.051$ | $d_{10} = 1.3958$ | | | | | | | |
| $r_{11} = \infty$ | $d_{11} = 1.00$ | $N_{11} = 1.523$ | Cover Glass | | | | | |
| $r_{12} = \infty$ | $d_{12} = 1.00$ | | | | | | | |

Focal Length f = 3.832 mm
Numerical Aperture Fno = 2.80

TABLE 4

| Radius of Curvature ($r_i$) | Distance ($d_i$) | Refractivity ($N_i$) | Abbe Number ($v_i$) | Aspheric Coefficient | | | | |
|---|---|---|---|---|---|---|---|---|
| | | | | k | $A_o$ | $B_o$ | $C_o$ | $D_o$ |
| $r_1 = -2.55$ | $d_1 = 0.90$ | $N_1 = 1.53$ | $v_1 = 56.0$ | -0.2277 | 0.1506e-1 | -0.1981e-2 | -0.9393e-3 | 0.2354e-3 |
| $r_2 = -3.30$ | $d_2 = 1.25$ | Aperture | | 0 | -0.4867e-3 | -0.3141e-2 | 0.542e-3 | -0.2214e-6 |
| $r_3 = \infty$ | $d_3 = 0.05$ | Diaphragm | | | | | | |
| $r_4 = \infty$ | $d_4 = 0.07$ | | | | | | | |
| $r_5 = 1.821$ | $d_5 = 0.85$ | $N_5 = 1.53$ | $v_5 = 56.0$ | 0 | -0.1278e-1 | 0.9956e-3 | -0.4357e-2 | 0.2534e-2 |
| $r_6 = -5.661$ | $d_6 = 0.30$ | | | 0 | -0.9681e-2 | -0.3167e-2 | -0.4366e-2 | 0.2074e-2 |
| $r_7 = -1.58$ | $d_7 = 0.70$ | $N_7 = 1.583$ | $v_7 = 30.0$ | 0 | 0.274e-1 | 0.196e-1 | -0.108e-1 | 0.6145e-2 |
| $r_8 = 2.647$ | $d_8 = 0.04$ | | | | | | | |
| $r_9 = 2.647$ | $d_9 = 1.70$ | $N_9 = 1.53$ | $v_9 = 56.0$ | -0.2896 | 0.2136e-1 | 0.12e-1 | -0.2574e-2 | 0.9287e-3 |
| $r_{10} = -2.051$ | $d_{10} = 1.3958$ | | | | | | | |
| $r_{11} = \infty$ | $d_{11} = 1.00$ | $N_{11} = 1.523$ | Cover Glass | | | | | |
| $r_{12} = \infty$ | $d_{12} = 1.00$ | | | | | | | |

Focal Length f = 3.799 mm
Numerical Aperture Fno = 2.80

Below, the characteristics of each of the embodiments are discussed, together with the comparative examples. In the first and second embodiments as well as in the first and second comparative examples, ZEONEX E48R (ZEONEX is a registered trademark, and E48R is a product number, of Nippon Zeon Co., Ltd.), which is a cycloolefin plastic, was employed in the first lens ($L_1$), which has a meniscus shape with the concave surface facing the object side and with negative refractive power, the second lens ($L_2$), which has convex surfaces on both the object side and the image side and which has a positive refractive power, and the fourth lens ($L_4$), which has a convex surface on both the object side and the image side, and has positive refractive power.

The third lens ($L_3$), having concave surface on both the object side and the image side and with a negative refractive power, adopts a polycarbonate. Both surfaces of the first lens ($L_1$), both surfaces of the second lens ($L_2$), the object-side surface of the third lens ($L_3$), and the image-side surface of the fourth lens ($L_4$) are aspherical. That is, the number of aspherical surfaces is six in each of the embodiments and comparative examples.

The Abbe number of the ZEONEX E48R which is the material of the first lens ($L_1$), second lens ($L_2$) and fourth lens ($L_4$) is 56, but as a result of simulations it was found that if the Abbe number of the material of these lenses is in the range from 45 to 65, no practical difference occurs in the aberration or other lens performance. The Abbe number of the polycarbonate which is the material of the third lens ($L_3$) is 30, but similarly to the above, it was found that if the Abbe number of this lens material is in the range from 25 to 35, no practical difference occurs in the aberration or other lens performance. That is, it was found that if the Abbe numbers are within the above-described respective ranges, a pickup lens can be realized which achieves the objects of this invention, which are the satisfactory correction of various aberrations of the pickup lens compared with the various aberrations of the pickup lenses of the prior art, and an optical length of 10 mm or less.

Between the lens system and the pickup surface, cover glass is inserted which is 0.60 mm thick in the first embodiment, and is 1.00 mm thick in the second embodiment and in the first and second comparative examples; the various aberrations described below are calculated assuming the existence of this cover glass. That is, this cover glass comprises the surfaces $r_{11}$ and $r_{12}$, and the parameter $d_{11}$ representing the thickness is $d_{11}$=0.60 mm in the first embodiment, and is $d_{11}$=1.00 mm in the second embodiment and in the first and second comparative examples.

First Embodiment (A) The focal length for the entire system is f=3.315 mm.
(B) The thickness of the first lens is $d_1$=0.72 mm.
(C) The radius of curvature of the object-side surface of the first lens is $r_1$=-1.72 mm.
(D) The radius of curvature of the image-side surface of the first lens is $r_2$=-2.53 mm.

Because $(r_2+r_1)/(r_2-r_1)$=+5.2469, this lens system satisfies the condition of equation (1). And, because 0.15f=0.497, $d_1$=0.72 and 0.3f=0.9945, the condition of equation (2) is also satisfied.

Figure 2:
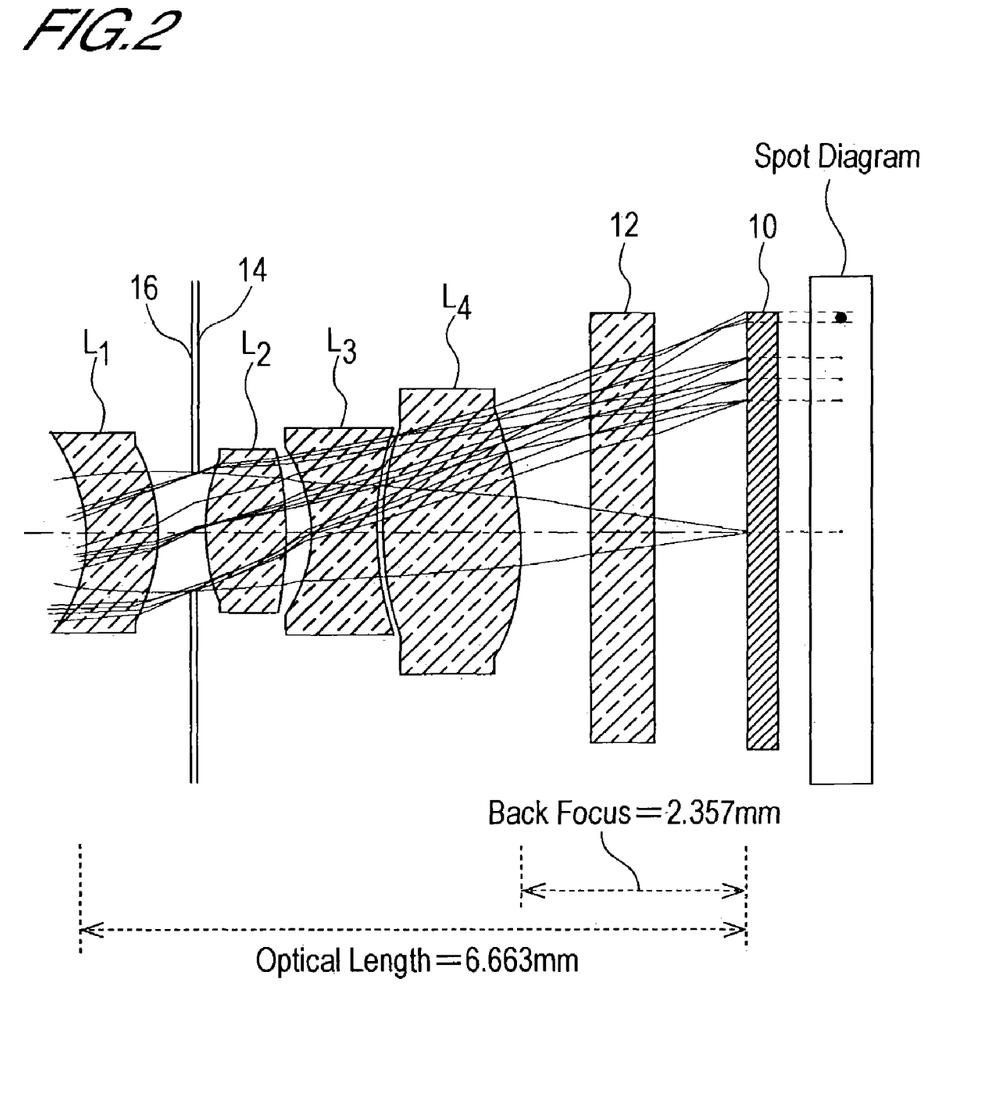
FIG. 2 is a summary cross-sectional view to explain a first embodiment of a pickup lens of this invention.

FIG. 2 shows the results of ray tracing, and a spot diagram showing the spreading of a point image on the pickup surface. It is seen that there is some spreading of the point image only at the position very close to the angle of field, and that a satisfactory point image is obtained over nearly the entirety of the pickup surface.

The optical length is 6.663 mm, which is less than 10 mm, and a sufficient back focus of 2.357 mm is also secured.

Figure 3:
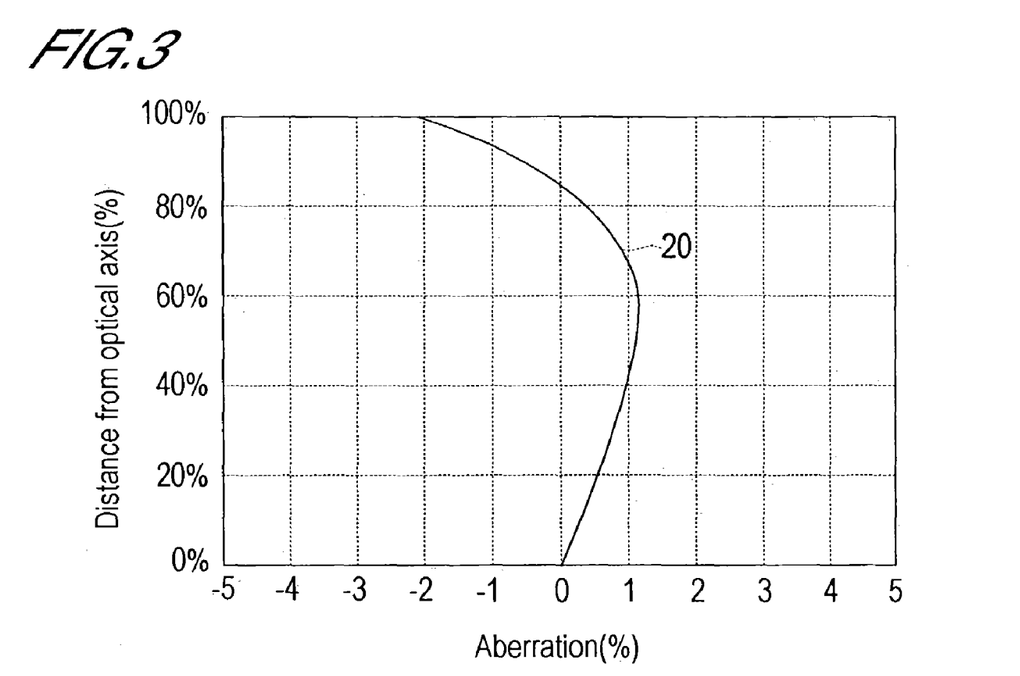
FIG. 3 is a graph of distortion aberration of the pickup lens of FIG. 2.
Figure 4:
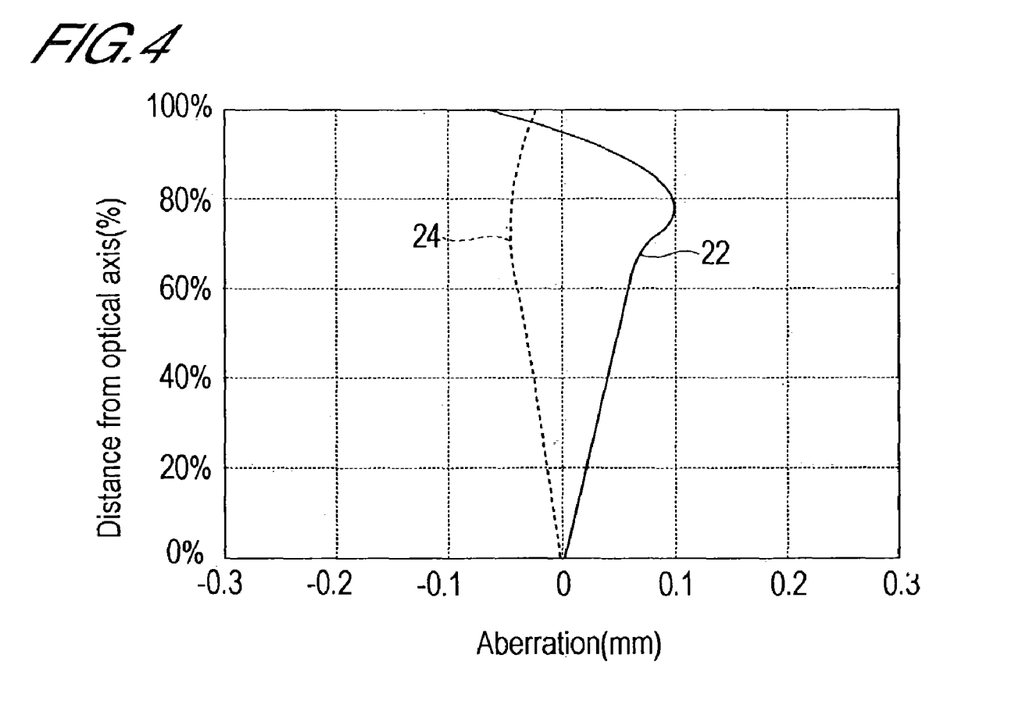
FIG. 4 is a graph of astigmatic aberration of the pickup lens of FIG. 2.
Figure 5:
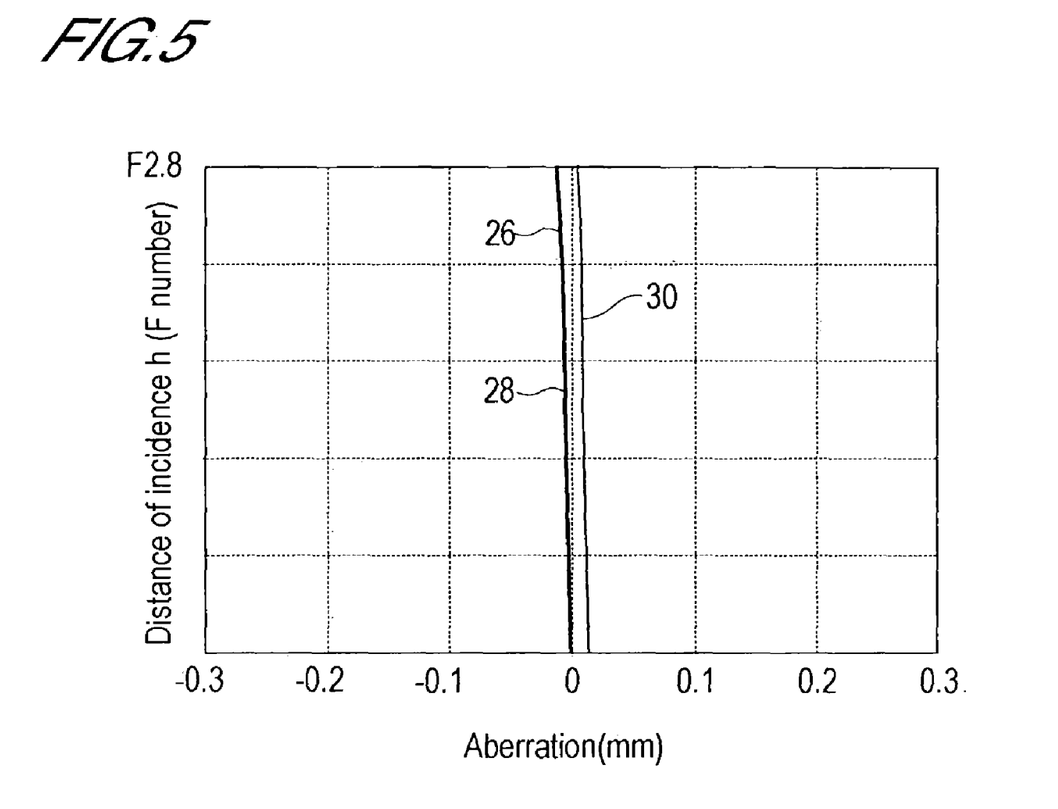
FIG. 5 is a graph of chromatic/spherical aberration of the pickup lens of FIG. 2.

Graphs are shown of the distortion aberration curve 20 in FIG. 3, astigmatic aberration curves (aberration curve 22 for the meridional plane and aberration curve 24 for the sagittal plane) in FIG. 4, and chromatic/spherical aberration curves (aberration curve 26 for the C line, aberration curve 28 for the d line, and aberration curve 30 for the g line; however, there is almost no difference between the aberration curves 26 and 28, which overlap) in FIG. 5. The vertical axes of the aberration curves of FIG. 3 and FIG. 4 show the image height, with 100%, 85%, 70%, 50%, and 30% corresponding respectively to 2.187 mm, 1.859 mm, 1.531 mm, 1.093 mm, and 0.656 mm. The horizontal axis indicates the magnitude of aberration. The vertical axis of the aberration curve of FIG. 5 shows the distance of incidence h (F number); the maximum is F2.8.

The distortion aberration is within 2%, the astigmatic aberration is within 0.1 mm, and the chromatic/spherical aberration is less than 0.02 mm. In all cases, the performance necessary for a lens mounted in a compact camera which uses a CCD or CMOS device as the pickup element is secured.

Second Embodiment (A) The focal length for the entire system is f=3.812 mm.
(B) The thickness of the first lens is $d_1$=0.9 mm.
(C) The radius of curvature of the object-side surface of the first lens is $r_1$=−2.45 mm.
(D) The radius of curvature of the image-side surface of the first lens is $r_2$=−3.35 mm.

Because $(r_2+r_1)/(r_2-r_1)$=+6.444, this lens system satisfies the condition of equation (1). And, because 0.15f=0.572, $d_1$=0.9 and 0.3f=1.144, the condition of equation (2) is also satisfied.

Figure 6:
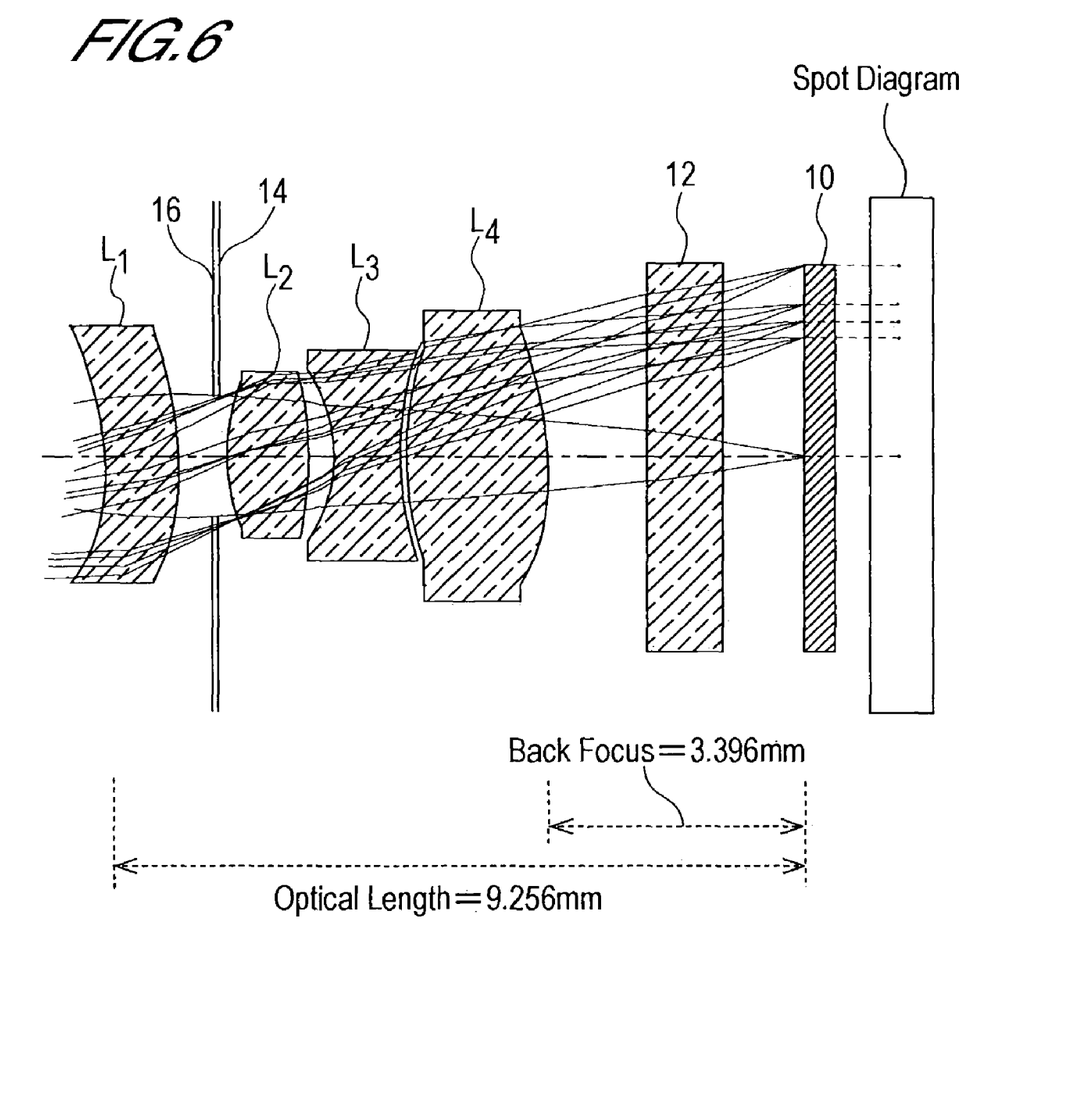
FIG. 6 is a summary cross-sectional view to explain a second embodiment of a pickup lens of this invention.

FIG. 6 shows the results of ray tracing, and a spot diagram showing the spreading of a point image on the pickup surface. A satisfactory point image is obtained over the entirety of the pickup surface, including the point image at positions very close to the angle of field.

The optical length is 9.256 mm, which is less than 10 mm, and a sufficient back focus of 3.396 mm is also secured.

Figure 7:
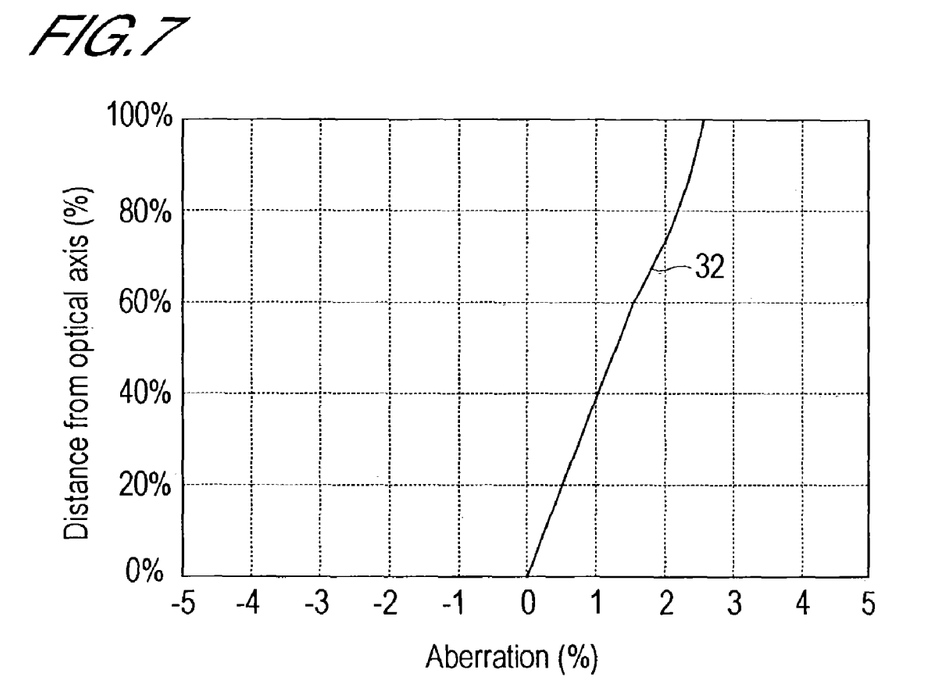
FIG. 7 is a graph of distortion aberration of the pickup lens of FIG. 6.
Figure 8:
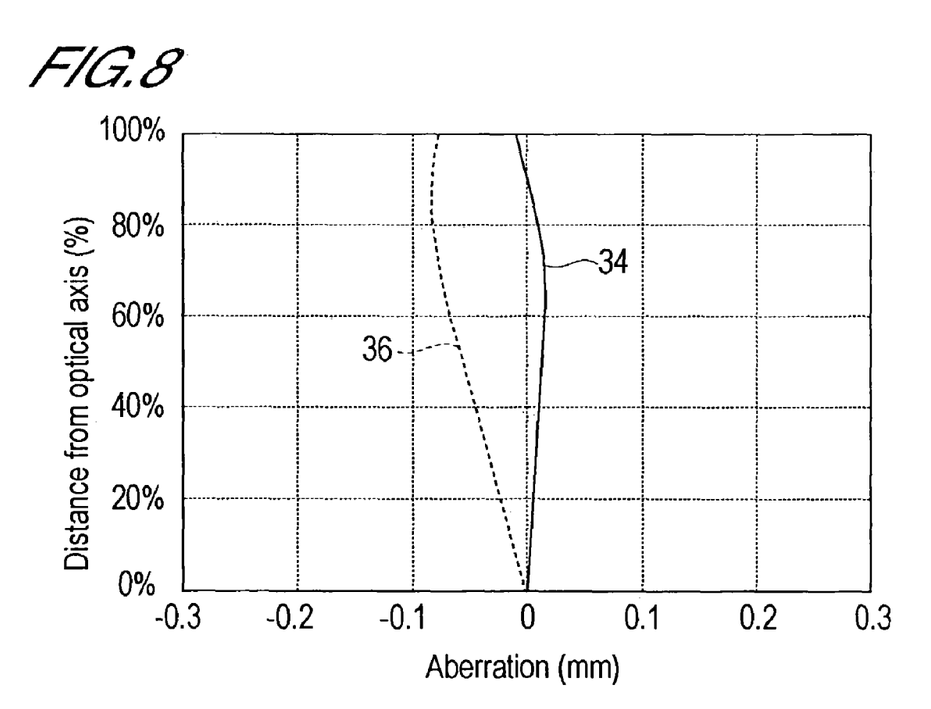
FIG. 8 is a graph of astigmatic aberration of the pickup lens of FIG. 6.
Figure 9:
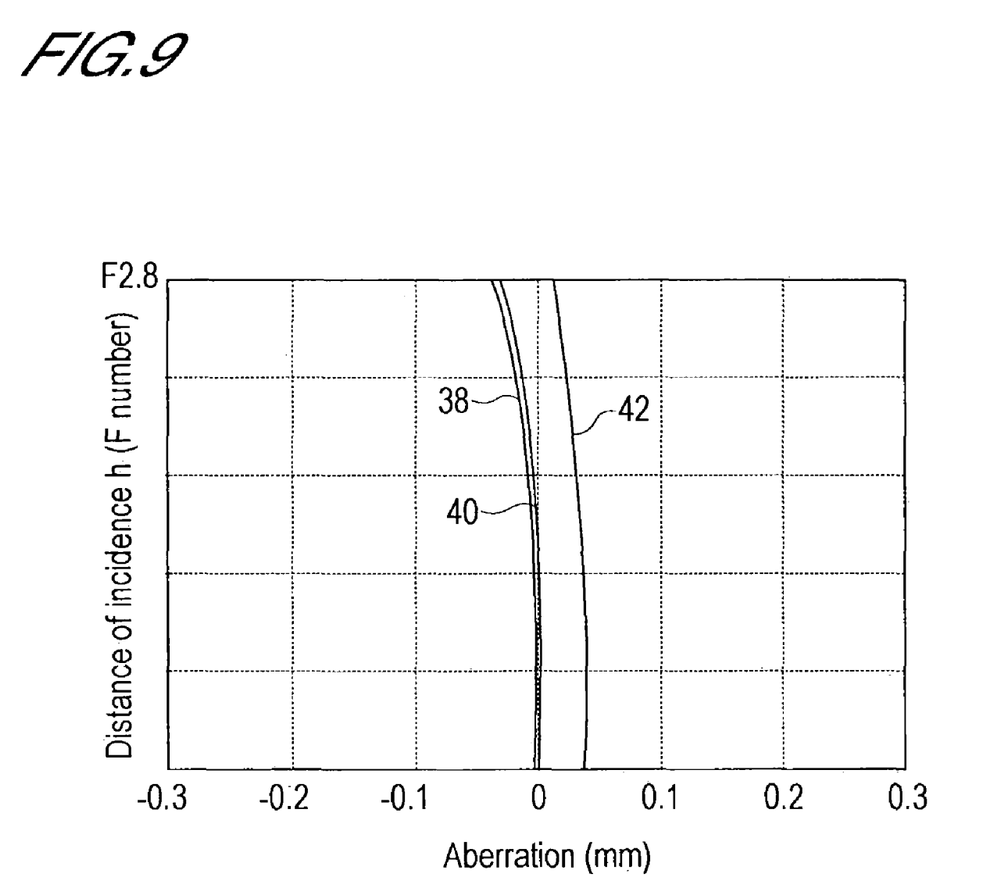
FIG. 9 is a graph of chromatic/spherical aberration of the pickup lens of FIG. 6.

Graphs are shown of the distortion aberration curve 32 in FIG. 7, astigmatic aberration curves (aberration curve 34 for the meridional plane and aberration curve 36 for the sagittal plane) in FIG. 8, and chromatic/spherical aberration curves (aberration curve 38 for the C line, aberration curve 40 for the d line, and aberration curve 42 for the g line) in FIG. 9. The vertical axes of the aberration curves of FIG. 7 and FIG. 8 show the image height, with 100%, 85%, 70%, 50%, and 30% corresponding respectively to 2.250 mm, 1.913 mm, 1.575 mm, 1.125 mm, and 0.675 mm. The vertical axis of the aberration curve of FIG. 9 shows the distance of incidence h (F number); the maximum is F2.8. The horizontal axis shows the magnitude of the aberration. The distortion aberration is within 2.6%, the astigmatic aberration is within 0.08 mm, and the chromatic/spherical aberration is less than 0.05 mm. In all cases, the performance with respect to aberration is that necessary for a lens mounted in a compact camera which uses a CCD or CMOS device as the pickup element.

FIRST COMPARATIVE EXAMPLE (A) The focal length for the entire system is f=3.832 mm.
(B) The thickness of the first lens is $d_1$=0.9 mm.
(C) The radius of curvature of the object-side surface of the first lens is $r_1$=−2.25 mm.
(D) The radius of curvature of the image-side surface of the first lens is $r_2$=−3.40 mm.

Because $(r_2+r_1)/(r_2-r_1)$=+4.913, the value for this lens system is below the lower limit of the condition of equation (1), so that the condition is not satisfied.

Figure 10:
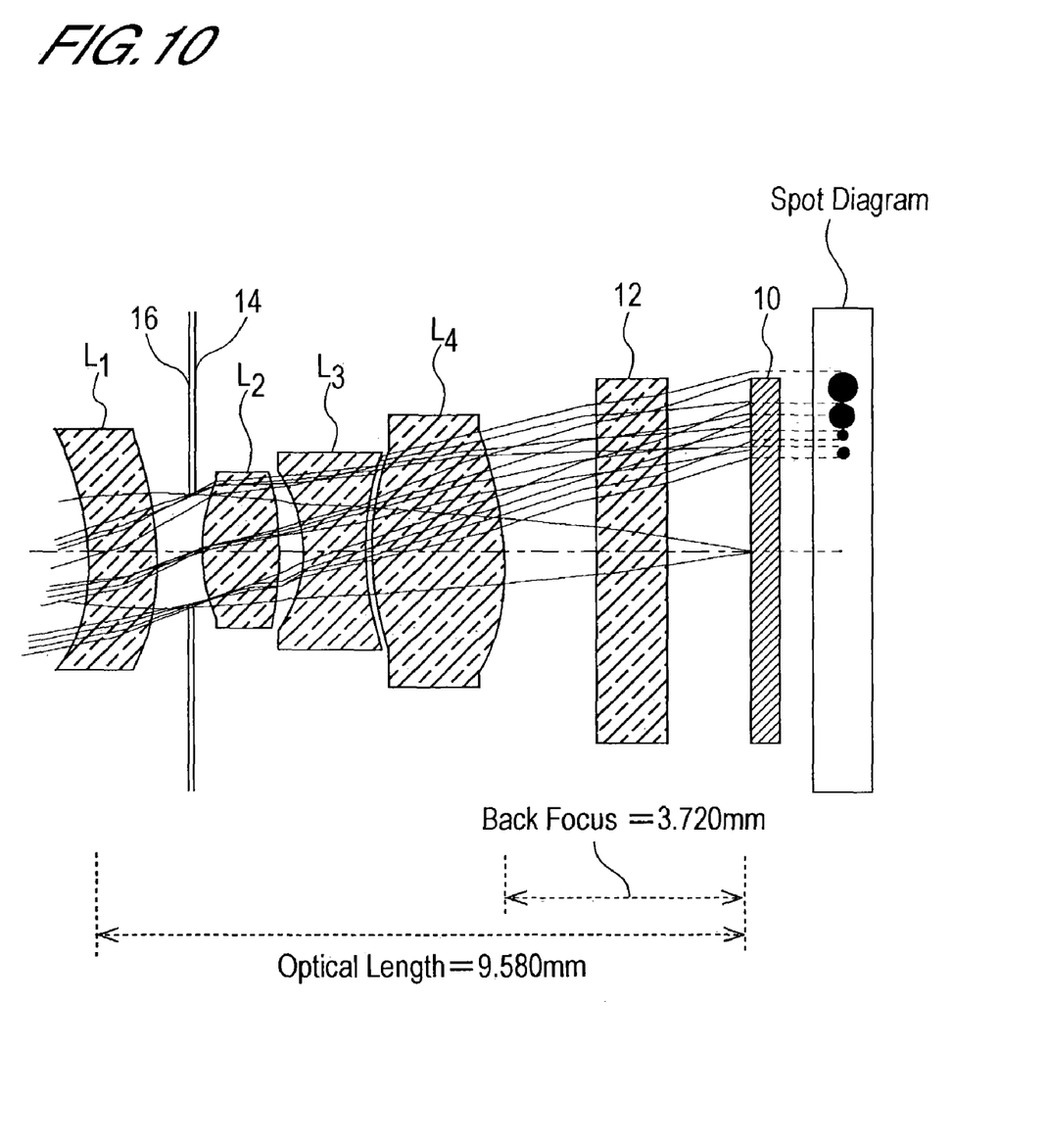
FIG. 10 is a summary cross-sectional view to explain a first comparative example of a pickup lens of this invention.

FIG. 10 shows the results of ray tracing, and a spot diagram showing the spreading of a point image on the pickup surface. It is seen that spreading of the point image increases in moving toward the periphery of the pickup surface, and that a satisfactory point image is not obtained at the peripheral portion on the pickup surface.

Figure 11:
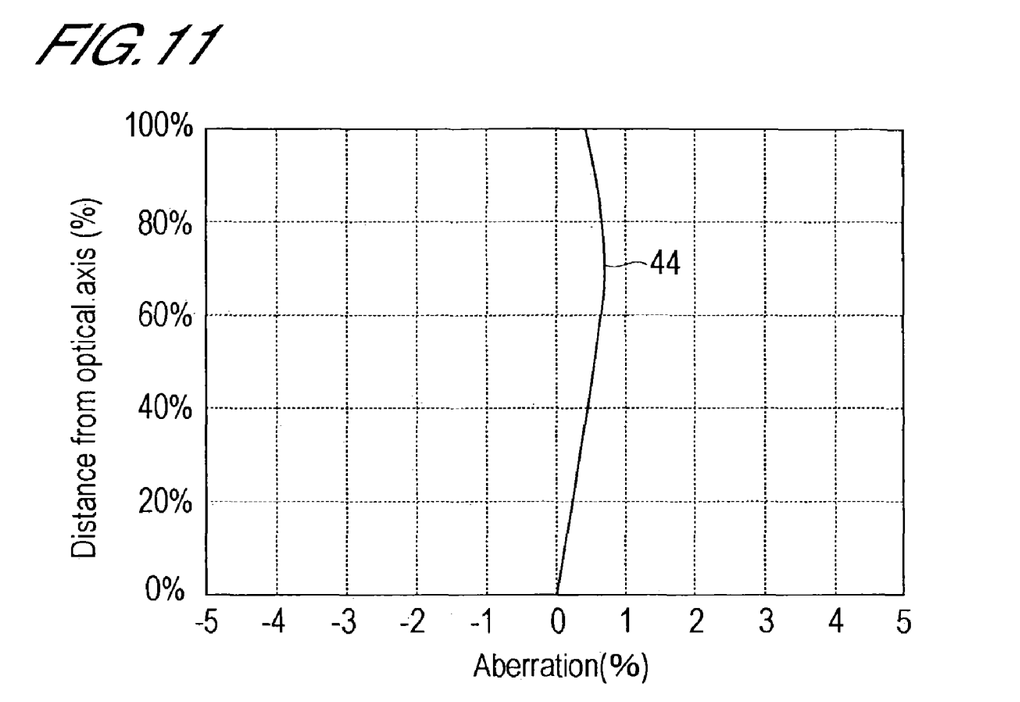
FIG. 11 is a graph of distortion aberration of the pickup lens of FIG. 10.
Figure 12:
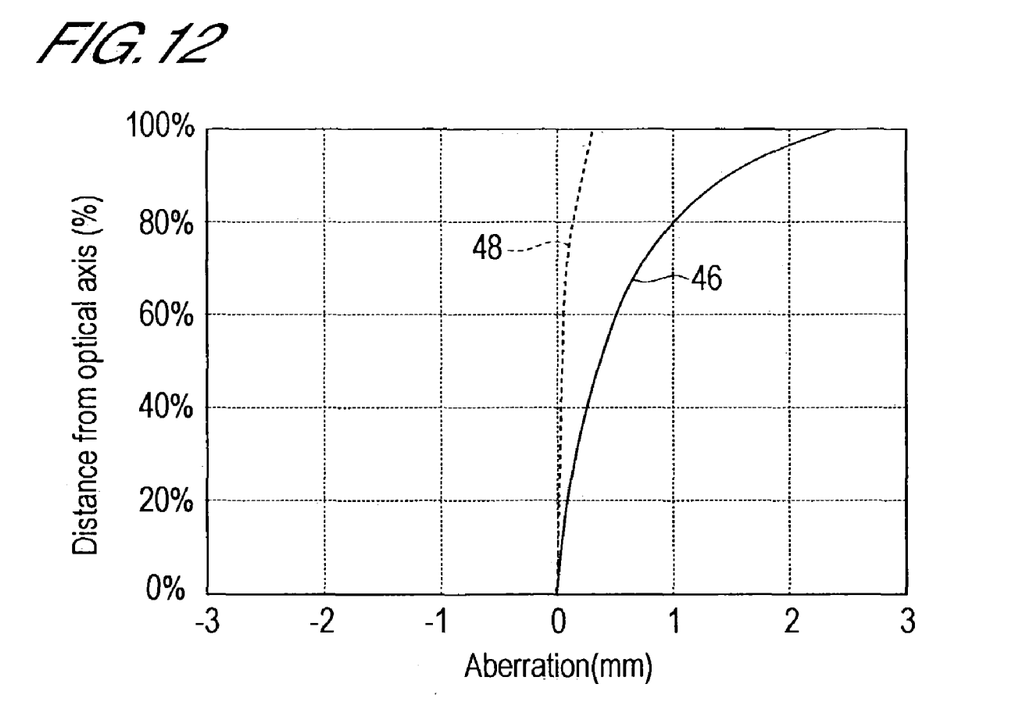
FIG. 12 is a graph of astigmatic aberration of the pickup lens of FIG. 10.
Figure 13:
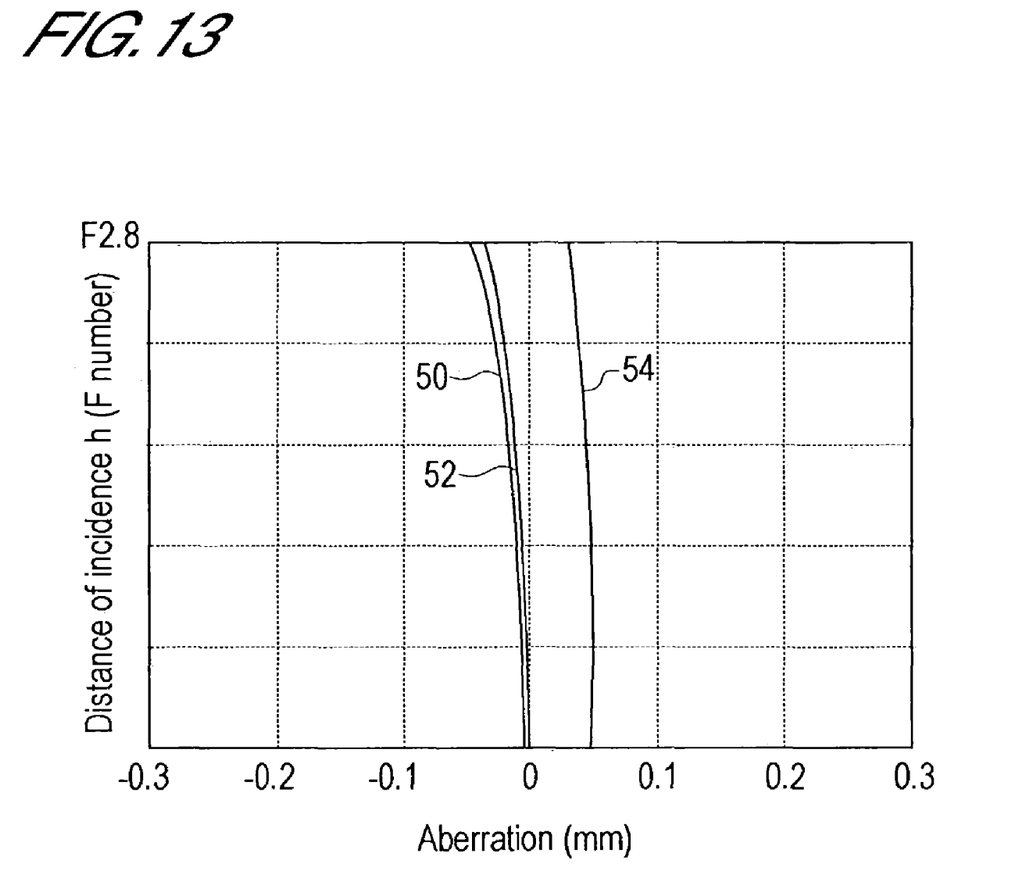
FIG. 13 is a graph of chromatic/spherical aberration of the pickup lens of FIG. 10.

The vertical axes of the aberration curves of FIG. 11 and FIG. 12 show the image height, with 100%, 85%, 70%, 50%, and 30% corresponding respectively to 2.249 mm, 1.911 mm, 1.574 mm, 1.124 mm, and 0.675 mm. The vertical axis of the aberration curve of FIG. 13 shows the distance of incidence h (F number); the maximum is F2.8. The horizontal axis indicates the magnitude of aberration.

The distortion aberration is within 0.7%, and the chromatic/spherical aberration is less than 0.06 mm. However, the astigmatic aberration is, for an image height of 2.249 mm, 2.3 mm in the meridional plane.

The distortion aberration curve 44 shown in FIG. 11 and the chromatic/spherical aberration curves shown in FIG. 13 (aberration curve 50 for the C line, aberration curve 52 for the d line, and aberration curve 54 for the g line) indicate satisfactory characteristics; but among the astigmatic aberration curves shown in FIG. 12 (aberration curve 46 for the meridional plane, aberration curve 48 for the sagittal plane), values in the meridional plane are large (aberration curve 46). In these respects, characteristics are not satisfactory compared with the embodiments.

SECOND COMPARATIVE EXAMPLE (A) The focal length for the entire system is f=3.799 mm.
(B) The thickness of the first lens is $d_1$=0.9 mm.
(C) The radius of curvature of the object-side surface of the first lens is $r_1$=−2.55 mm.
(D) The radius of curvature of the image-side surface of the first lens is $r_2$=−3.30 mm.

Because $(r_2+r_1)/(r_2-r_1)$=+7.800, the value for this lens system is above the upper limit of the condition of equation (1), so that the condition is not satisfied.

Figure 14:
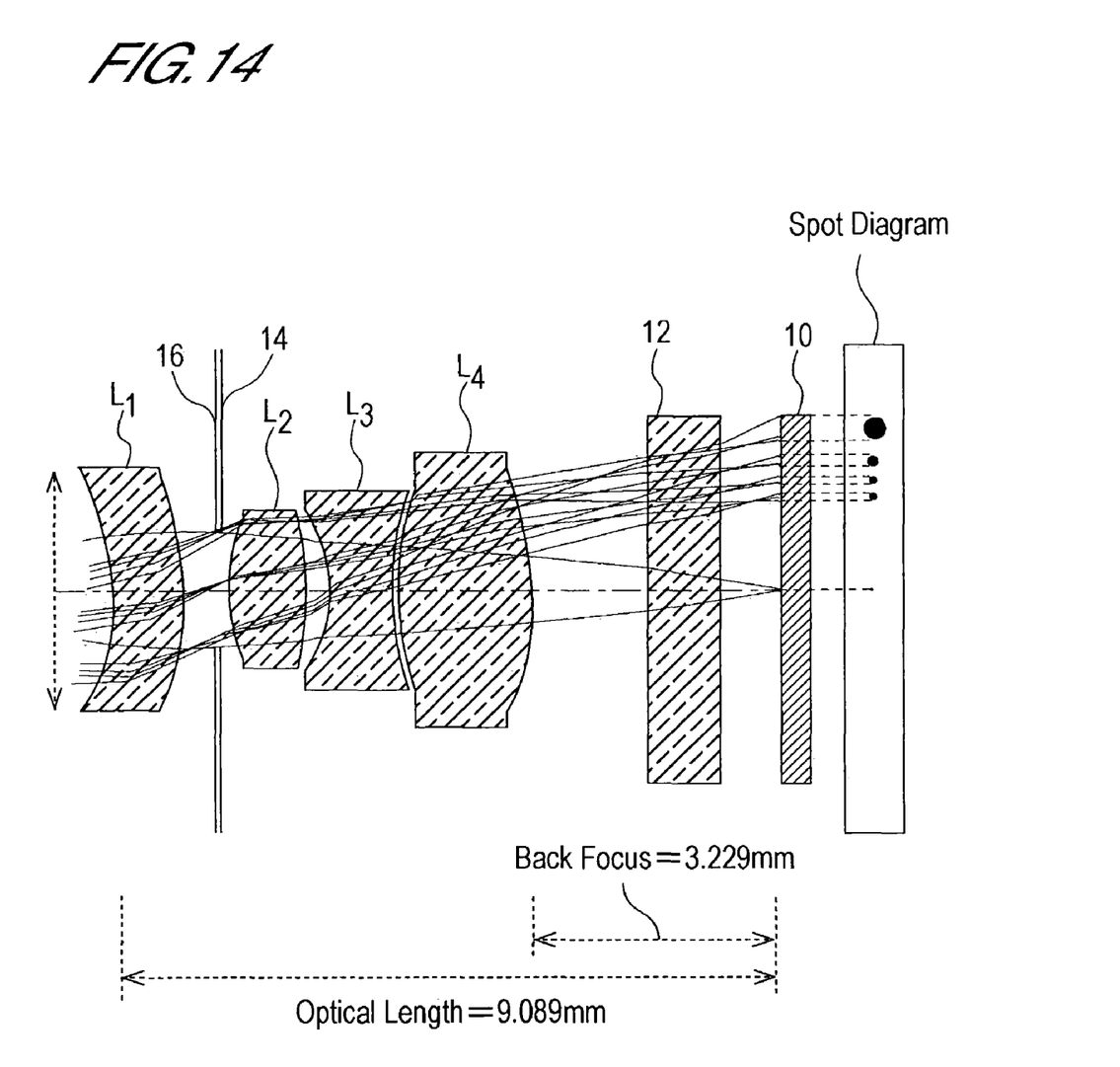
FIG. 14 is a summary cross-sectional view to explain a second comparative example of a pickup lens of this invention.

FIG. 14 shows the results of ray tracing, and a spot diagram showing the spreading of a point image on the pickup surface. Similarly to the first comparative example, spreading of the point image increases in moving toward the periphery of the pickup surface, and a satisfactory point image is not obtained at the peripheral portion on the pickup surface.

Figure 15:
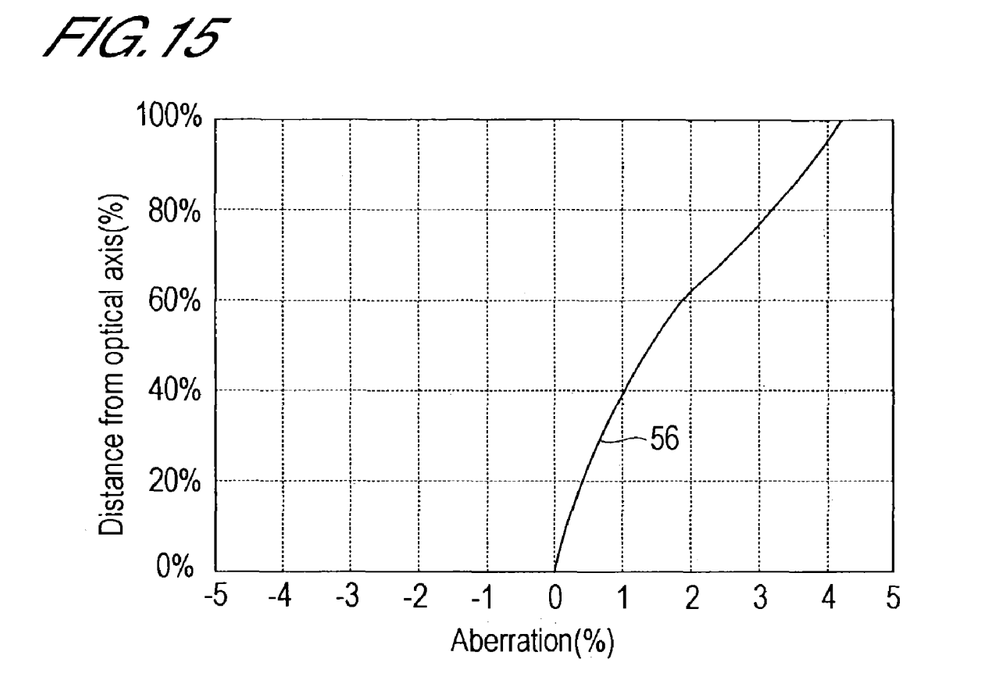
FIG. 15 is a graph of distortion aberration of the pickup lens of FIG. 14.
Figure 16:
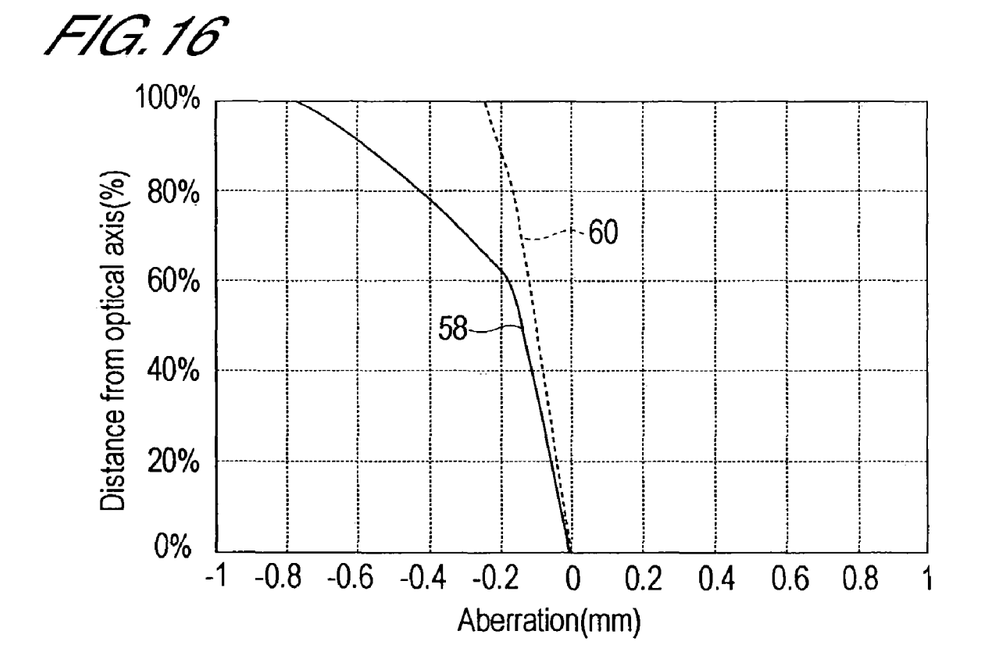
FIG. 16 is a graph of astigmatic aberration of the pickup lens of FIG. 14.
Figure 17:
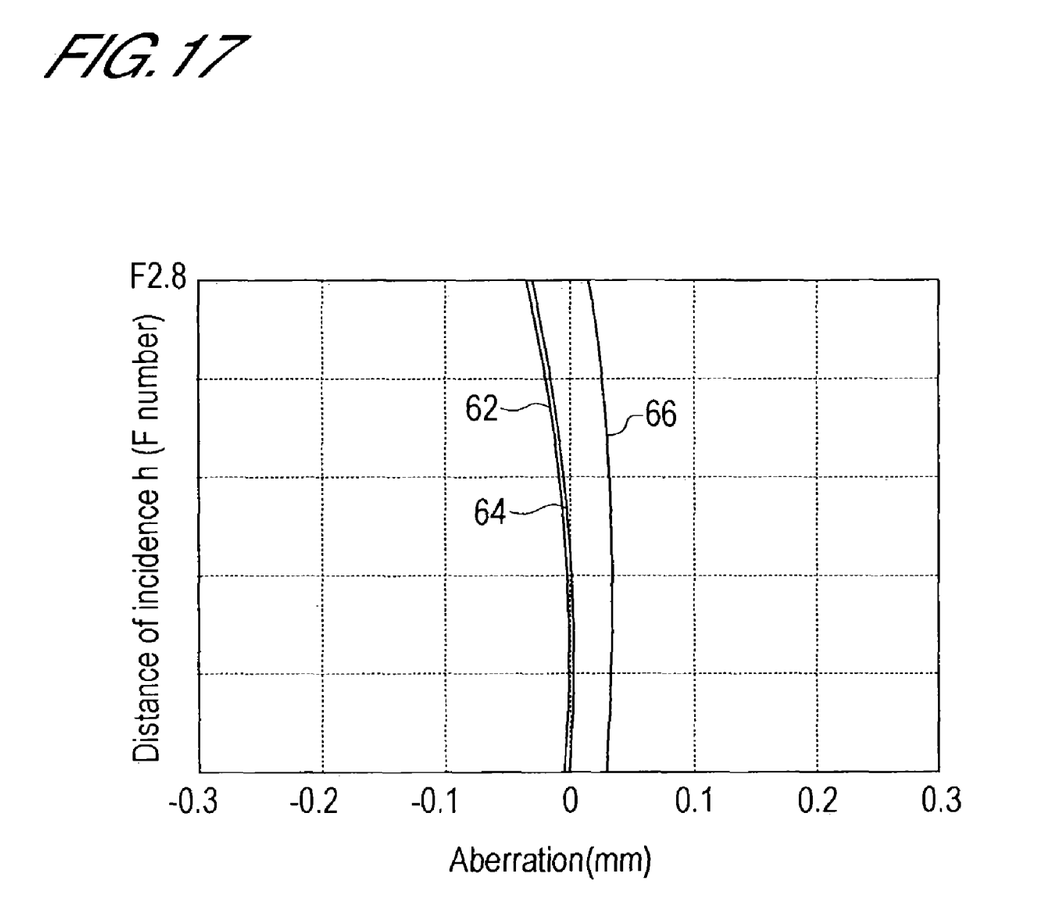
FIG. 17 is a graph of chromatic/spherical aberration of the pickup lens of FIG. 14.

The vertical axes of the aberration curves of FIG. 15 and FIG. 16 show the image height, with 100%, 85%, 70%, 50%, and 30% corresponding respectively to 2.252 mm, 1.914 mm, 1.576 mm, 1.126 mm, and 0.675 mm. The vertical axis of the aberration curve of FIG. 17 shows the distance of incidence h (F number); the maximum is F2.8. The horizontal axis indicates the magnitude of aberration.

The chromatic/spherical aberration is less than 0.04 mm. However, the distortion aberration is 4.2%, and the astigmatic aberration is, for an image height of 2.252 mm, 0.78 mm in the meridional plane.

The chromatic/spherical aberration curves shown in FIG. 17 (aberration curve 62 for the C line, aberration curve 64 for the d line, and aberration curve 66 for the g line) indicate satisfactory characteristics; but as is seen from the distortion aberration curve 56 shown in FIG. 15 and the astigmatic aberration curves shown in FIG. 16 (aberration curve 58 for the meridional plane, aberration curve 60 for the sagittal plane), the distortion aberration and the astigmatic aberration in the meridional plane (aberration curves 56 and 58) are large. In these respects, characteristics are not satisfactory compared with the embodiments.

Thus from the above embodiments and comparative examples, it is seen that by designing a lens configured so as to satisfy equation (1) and equation (2), which give the conditions under which various aberrations are satisfactorily corrected, a sufficient back focus is obtained, and moreover the optical length is kept short, the problems to be solved by this invention can be solved.

In the embodiments and comparative examples, the plastic materials ZEONEX E48R and polycarbonate were used in the first, second and fourth lenses, and in the third lens, respectively; but plastic materials other than those described in the embodiments may be also be used, and in addition, materials other than plastic, such as glass, may of course also be used, so long as the materials satisfy the conditions explained in the embodiments.

As explained above, by means of this invention a pickup lens can be realized which, while comprising only four elements in four groups, enables effective utilization of plastic lenses, achieves satisfactory correction of various aberrations, can be manufactured at low cost, had an optical length of 10 mm or less, and is suitable for use in compact CCD cameras. It is difficult for a pickup lens which utilizes as components lenses employing material with a d-line refractivity of 1.583 and having refractivity wavelength dispersion characteristics with an Abbe number of approximately 30, with all such component lenses formed from optical glass. From another point of view, in the embodiments of this invention, it was possible to present new experimental results demonstrating that even a material having a large wavelength dispersion characteristic with an Abbe number of approximately 30 can be used in the lens configuration method of this invention to form a combination lens enabling satisfactory images.

As explained above, a pickup lens of this invention is suitable for use as, in addition to a lens for a video camera incorporated into a portable telephone, as the lens of a video camera incorporated into a PDA (personal digital assistant), as the lens of a video camera incorporated into a toy comprising image recognition functions, and as the lens of monitoring video cameras and security video cameras.

What is claimed is:

1. A pickup lens, comprising a first lens $L_1$, having a meniscus shape with concave surface on the object side, and having negative refractive power; an aperture diaphragm S; a second lens $L_2$, with convex surfaces on both the object side and the image side, and having positive refractive power; a third lens $L_3$, with concave surfaces on both the object side and the image side, and having negative refractive power; and a fourth lens $L_4$, with convex surfaces on both the object side and the image side, and having positive refractive power; and configured by arranging in order, from the object side, the first lens $L_1$, the aperture diaphragm S, the second lens $L_2$, the third lens $L_3$, and the fourth lens $L_4$; and wherein at least three lens surfaces among the surfaces of said first through fourth lenses are aspherical, and the following conditions are satisfied:

$$+5.0<(r_2+r_1)/(r_2-r_1)<+7.0 \qquad (1)$$

$$0.15f<d_1<0.3f \qquad (2)$$

where $r_1$ is the radius of curvature of the object-side surface of the first lens in the vicinity of the optical axis (axial radius of curvature); $r_2$ is the radius of curvature of the image-side surface of the first lens in the vicinity of the optical axis (axial radius of curvature); $d_1$ is the thickness of the first lens; and, f is the focal length of the entire system (the combined focal length of the lens system comprising the first, second, third, and fourth lenses).

2. The pickup lens according to claim 1, wherein all the lenses comprised by the pickup lens are formed from plastic material.

3. The pickup lens according to claim 1, wherein said first lens $L_1$, said second lens $L_2$, and said fourth lens $L_4$ are lenses formed from material with an Abbe number in the range from 45 to 65, and said third lens $L_3$ is a lens formed from material with an Abbe number in the range from 25 to 35.

4. The pickup lens according to claim 2, wherein, among the lenses comprised by the pickup lens, said first lens $L_1$, said second lens $L_2$, and said fourth lens $L_4$ are lenses formed using a cycloolefin plastic, and said third lens $L_3$ is a lens formed from polycarbonate.

5. The pickup lens according to claim 3, wherein the distance from the object-side surface of said first lens to the image plane is 10 mm or less.

6. The pickup lens according to claim 4, wherein the distance from the object-side surface of said first lens to the image plane is 10 mm or less.

* * * * *